(12) United States Patent
Mei

(10) Patent No.: US 12,376,705 B2
(45) Date of Patent: Aug. 5, 2025

(54) AERATION PLATE AND FRUIT AND VEGETABLE CLEANING MACHINE

(71) Applicant: NINGBO MENGO KITCHEN EQUIPMENT CO., LTD, Ningbo (CN)

(72) Inventor: Zurui Mei, Ningbo (CN)

(73) Assignee: NINGBO MENGO KITCHEN EQUIPMENT CO., LTD, Ningbo (CN)

(*) Notice: Subject to any disclaimer, the term of this patent is extended or adjusted under 35 U.S.C. 154(b) by 404 days.

(21) Appl. No.: 17/789,526

(22) PCT Filed: Mar. 18, 2021

(86) PCT No.: PCT/CN2021/081645
§ 371 (c)(1),
(2) Date: Jun. 28, 2022

(87) PCT Pub. No.: WO2021/185334
PCT Pub. Date: Sep. 23, 2021

(65) Prior Publication Data
US 2023/0046198 A1    Feb. 16, 2023

(30) Foreign Application Priority Data
Mar. 20, 2020  (CN) .......................... 202020359733.5

(51) Int. Cl.
*A47J 43/24* (2006.01)
*B01F 23/23* (2022.01)
(Continued)

(52) U.S. Cl.
CPC ....... *A47J 43/24* (2013.01); *B01F 23/231151* (2022.01); *B01F 23/231231* (2022.01);
(Continued)

(58) Field of Classification Search
None
See application file for complete search history.

(56) References Cited

U.S. PATENT DOCUMENTS

| 4,407,032 A | 10/1983 | Bauer et al. |
| 2009/0211615 A1 | 8/2009 | Ho |

FOREIGN PATENT DOCUMENTS

| CN | 2657558 Y | 11/2004 |
| CN | 202920004 U | 5/2013 |

(Continued)

OTHER PUBLICATIONS

CN 108851117 A translation, A Small Efficient Fruit And Vegetable Cleaning Machine, Luo (Year: 2018).*

*Primary Examiner* — Cristi J Tate-Sims
(74) *Attorney, Agent, or Firm* — Bayramoglu Law Offices LLC

(57) ABSTRACT

An aeration plate is provided, including an aeration top plate portion and a side baffle portion. The aeration top plate portion is scattered with a plurality of aeration holes, such that the aeration top plate portion and the side baffle portion cooperate to form an aeration member. A fruit and vegetable cleaning machine is provided, including a machine body. The machine body is provided with a cleaning tank with a top opening, and the cleaning tank is provided with the aeration plate at an inner bottom wall, such that an area enclosed by the aeration top plate portion, the side baffle portion, and the inner bottom wall forms a first dissolving zone for gas and water, and a second dissolving zone for bubbles and water is formed between a periphery of the aeration plate and the cleaning tank.

16 Claims, 2 Drawing Sheets

(51) Int. Cl.
    *B01F 23/231*     (2022.01)
    *B01F 23/237*     (2022.01)
    *B01F 31/85*     (2022.01)
    *B01F 35/00*     (2022.01)
    *B01F 35/71*     (2022.01)
    *B01F 101/24*     (2022.01)

(52) U.S. Cl.
    CPC ............... *B01F 23/231264* (2022.01); *B01F 23/237613* (2022.01); *B01F 23/238* (2022.01); *B01F 31/85* (2022.01); *B01F 35/55* (2022.01); *B01F 35/71805* (2022.01); *B01F 2101/24* (2022.01)

(56) References Cited

FOREIGN PATENT DOCUMENTS

| | | | | |
|---|---|---|---|---|
| CN | 103340336 A | 10/2013 | | |
| CN | 207784218 U | 8/2018 | | |
| CN | 209897998 U | 1/2020 | | |
| CN | 111588286 A | 8/2020 | | |
| CN | 212281105 U | 1/2021 | | |
| CN | 212521576 U | 2/2021 | | |
| WO | WO-2007008032 A1 * | 1/2007 | .............. | A47J 43/24 |

* cited by examiner

AERATION PLATE AND FRUIT AND VEGETABLE CLEANING MACHINE

CROSS REFERENCE TO THE RELATED APPLICATIONS

This application is the national stage entry of International Application No. PCT/CN2021/081645, filed on Mar. 18, 2021, which is based upon and claims priority to Chinese Patent Application No. 202020359733.5 filed on Mar. 20, 2020, the entire contents of which are incorporated herein by reference.

TECHNICAL FIELD

The utility model relates to the technical field of fruit and vegetable cleaning, and in particular, to an aeration plate and a fruit and vegetable cleaning machine.

BACKGROUND

The fruit and vegetable cleaning machine is an appliance for cleaning fruits and vegetables, and it is gradually favored by consumers due to its compact structure and convenient use.

Some fruit and vegetable cleaning machines are equipped with aeration plates. As for the aeration plates, the main consideration is to make the gas entering the aeration plate form bubbles of a suitable size and uniformly distribute the bubbles to effectively improve the cleaning effect.

Therefore, how to optimize the structure of the aeration plate to make the gas form bubbles of a suitable size and uniformly distribute the bubbles is a technical problem to be continuously improved by those skilled in the art.

SUMMARY

A technical problem to be solved by the utility model is to provide an aeration plate and a fruit and vegetable cleaning machine that can at least partially solve the above-mentioned technical problem.

A technical solution used by the utility model to solve the above technical problem is to provide an aeration plate, including an aeration top plate portion and a side baffle portion. The aeration top plate portion is scattered with a plurality of aeration holes, such that the aeration top plate portion and the side baffle portion cooperate to form an aeration member.

Further, the side baffle portion may be provided with holes, such that during liquid discharging, the liquid in the aeration plate can be discharged, and it can also play a role of aeration, and can also make bubble distribution more uniform.

Further, the aeration holes may be regularly arranged in rows in the aeration top plate portion, such that the overall arrangement is regular, which is easier to form a uniform and dispersed arrangement, and more conducive to uniform and dispersed formation and overflow of bubbles.

Further, the aeration holes may be regularly arranged in rows in a length direction of the aeration top plate portion, and may also be regularly arranged in rows in a width direction of the aeration top plate portion, such that whether in the length direction or the width direction, the aeration holes are in a regular row arrangement, which further satisfies dispersed and uniform formation and overflow of bubbles.

Further, any two adjacent aeration holes may be staggered, such that the bubbles can be distributed more uniformly.

Further, the aeration holes between any two adjacent rows may be staggered, such that the bubbles are distributed more uniformly.

The aeration plate of the utility model has a simple overall structure and the plurality of aeration holes, which is conducive to the formation of a large number of bubbles of a suitable size and dispersed and uniform overflow.

To solve the above technical problem, the utility model further provides a fruit and vegetable cleaning machine, including a machine body. The machine body is provided with a cleaning tank with a top opening, and the cleaning tank is provided with the above aeration plate at an inner bottom wall, such that an area enclosed by the aeration top plate portion, the side baffle portion, and the inner bottom wall forms a first dissolving zone for gas and water, and a second dissolving zone for bubbles and water is formed between a periphery of the aeration plate and the cleaning tank.

Further, the cleaning tank may be provided with the inclined inner bottom wall, and the side baffle portion located at a lower end of the inner bottom wall may be provided with a notch with an open end located at a bottom end surface of the side baffle portion, such that the notch becomes the hole, which not only fulfills the function of the hole, but also can be used for liquid passage, and can fully discharge the liquid in the aeration plate, avoiding the accumulation of the liquid.

Further, the aeration plate may be further provided with a mounting hole structure, and the mounting hole structure may be a first through hole configured for assembly of a gas inlet valve, such that the gas enters the aeration plate through the gas inlet valve.

Further, the aeration plate may be further provided with a mounting hole structure. The mounting hole structure may include a first through hole and a second through hole. The first through hole may be configured for assembly of a gas inlet valve. The second through hole may be configured for configuration of an ultrasonic vibrator. The second through hole may be provided with a downwardly protruding retaining wall portion at a peripheral edge, such that the first dissolving zone for the gas and the water may be formed by the area enclosed by the aeration top plate portion, the side baffle portion, the retaining wall portion, and the inner bottom wall. On the basis of adding the ultrasonic vibrator, the relatively closed first dissolving zone can also be formed.

Further, the retaining wall portion and the side baffle portion may form opposite openings at the lower end of the inner bottom wall. The retaining wall portion and the side baffle portion may be connected at side walls of the openings by a connecting baffle. The connecting baffle may extend upward to connect the aeration top plate portion, such that cleaning liquid in the retaining wall portion can also flow out through the opening.

The fruit and vegetable cleaning machine of the utility model has a compact and ingenious overall structure, and the arrangement between various components is reasonable. Through the arrangement of the aeration plate, an aeration effect can be formed on the filled gas, and on the basis of the first dissolving zone, the gas can form the uniformly dispersed bubbles of a suitable size after passing through the aeration holes of the aeration top plate.

BRIEF DESCRIPTION OF THE DRAWINGS

Hereinafter, embodiments of the utility model are described in more detail and by way of non-limiting examples with reference to the accompanying drawings, so as to provide a thorough understanding of the principles and spirit of the utility model.

It should be noted that the features and structures shown in the various drawings do not necessarily represent the actual shapes and sizes of the corresponding components and elements, but are only used to explain the principles of the embodiments of the utility model.

Figure 1:
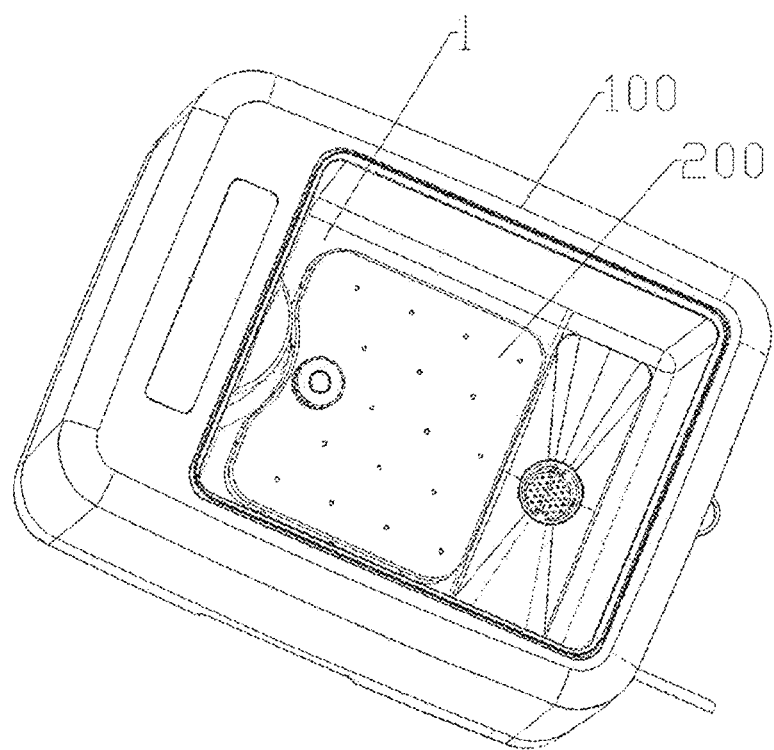
FIG. 1 is a partial structural diagram of a fruit and vegetable cleaning machine of the utility model.

Reference numerals: 1. cleaning tank, 2. aeration top plate portion, 3. side baffle portion, 4. aeration hole, 5. hole, 6. notch, 7. first through hole, 8. second through hole, 9. retaining wall portion, 10. opening, 11. connecting baffle, 100. machine body, and 200. aeration plate.

DETAILED DESCRIPTION OF THE EMBODIMENTS

Hereinafter, specific embodiments of the utility model will be described in detail by way of examples.

It should be understood that the drawings are schematic only and are not drawn to scale. It should also be understood that the same reference numerals are used throughout the drawings to indicate the same or similar parts.

It should be understood that the embodiments of the utility model are not limited to the examples listed below, and those skilled in the art can alter and modify the described embodiments by using the principles or spirit of the utility model to obtain other embodiments in different forms. Obviously, these embodiments all fall within the scope of protection required by the utility model.

In addition, it should be noted that the drawings referred to herein are to illustrate and explain the embodiments of the utility model, and the shape and size of each component and the connection between different components shown in the accompanying drawings are only to schematically illustrate the embodiments of the utility model and do not constitute a limitation on the protection scope of the utility model.

Figure 2:
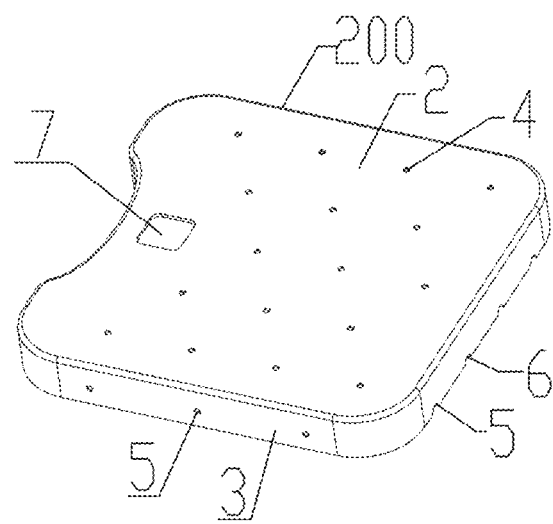
FIG. 2 is a schematic structural diagram of a first embodiment of an aeration plate of the utility model.
Figure 3:
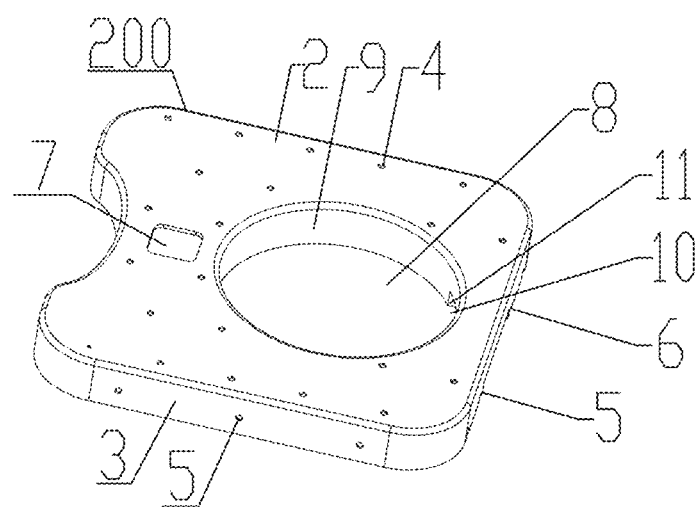
FIG. 3 is a schematic structural diagram of a second embodiment of the aeration plate of the utility model.

As shown in FIG. 1 to FIG. 3, the fruit and vegetable cleaning machine of the utility model is configured to clean fruits and vegetables, can be used at home, and can be directly placed on a countertop of a kitchen cabinet to form an independent fruit and vegetable cleaning machine on the countertop. The fruit and vegetable cleaning machine includes a machine body 100 and a gas inlet mechanism (not shown in the figure, which can be ventilated).

The machine body 100 is provided with a cleaning tank 1 with a top opening, and the cleaning tank 1 is provided with the aeration plate 200 at an inner bottom wall. The aeration plate 200 is configured to aerate the gas entering the aeration plate, such that bubbles of a suitable size are generated and the bubbles are uniformly distributed.

The gas introduced into the aeration plate by the gas inlet mechanism is generated by a gas pump, and ozone can also be introduced to increase the effect of sterilization and disinfection. In the present embodiment, the gas inlet mechanism includes the gas pump and an ozone mechanism, and the ozone generated by the ozone mechanism is introduced into the gas generated by the gas pump. Thus, the gas introduced into the aeration plate is a gas mixed with ozone.

In the present embodiment, the aeration plate 200 includes an aeration top plate portion 2 and a side baffle portion 3. The aeration top plate portion 2 is scattered with a plurality of aeration holes 4, and any two adjacent aeration holes 4 are staggered.

The aeration top plate portion 2 and the side baffle portion 3 cooperate to form an aeration member. Therefore, an area enclosed by the aeration top plate portion 2, the side baffle portion 3, and the inner bottom wall of the cleaning tank 1 forms a first dissolving zone for gas and water, and a second dissolving zone for bubbles and water is formed between a periphery of the aeration plate 200 and the cleaning tank 1.

In the present embodiment, the aeration hole 4 is a circular hole, though it may also be in other suitable shapes, which can facilitate the gas to form bubbles of a suitable size. Meanwhile, the aeration holes 4 are regularly arranged in rows in a length direction of the aeration top plate portion 2, and are also regularly arranged in rows in a width direction of the aeration top plate portion 2, and the aeration holes 4 between any two adjacent rows are staggered.

Therefore, the aeration holes formed are uniformly arranged, and basically a full arrangement effect is formed. In addition, the plurality of aeration holes are arranged, which can be understood as a large number of aeration holes, such that the bubbles formed are numerous and uniform dispersion and overflow can be achieved, which can effectively improve the cleaning effect.

Meanwhile, the side baffle portion 3 is also provided with holes 5, and the hole 5 and the adjacent aeration hole 4 at the aeration top plate portion 2 are also staggered. In this way, the cleaning liquid can be discharged during liquid discharging, and the gas flowing to the side baffle portion 3 can also form bubbles through the holes 5 and overflow. Thereby, the gas flowing to the side baffle portion 3 is prevented from flowing back to the aeration hole 4 adjacent to the hole 5 and overflowing, and finally the bubbles overflowing on the aeration plate are ensured to be uniformly distributed. The hole 5 may be in other shapes such as a circular hole, as long as bubbles of a suitable size and uniform distribution can overflow.

The staggered arrangement mentioned above can make the distribution of the overflowing bubbles more uniform.

In some embodiments, to facilitate drainage, the cleaning tank 1 is provided with the inclined inner bottom wall, and the side baffle portion 3 located at a lower end of the inner bottom wall is provided with a notch 6 with an open end located at a bottom end surface of the side baffle portion 3, such that the notch 6 forms the above hole 5. The notch 6 may be a semi-circular hole or in other suitable shapes. Through the arrangement of the notch 6 with the open end located at the bottom end surface of the side baffle portion 3, on the premise of satisfying the function of the hole 5, the cleaning liquid in the first dissolving zone can be fully and completely discharged.

In some embodiments, the aeration plate 200 is further provided with a mounting hole structure, and the mounting hole structure is a first through hole 7 configured for assembly of a gas inlet valve (not shown in the figures). Therefore, the gas can enter the aeration plate 200 through the gas inlet valve.

In some other embodiments, the aeration plate 200 is further provided with a mounting hole structure. The mounting hole structure includes a first through hole 7 and a second through hole 8. The first through hole 7 is configured for assembly of a gas inlet valve. The second through hole 8 is configured for configuration of an ultrasonic vibrator (not shown in the figure). The second through hole 8 is provided with a downwardly protruding retaining wall portion 9 at a peripheral edge. The first dissolving zone for the gas and the water is formed by the area enclosed by the aeration top plate portion 2, the side baffle portion 3, the retaining wall portion 9, and the inner bottom wall of the cleaning tank 1.

In order to discharge the cleaning liquid in the retaining wall portion 9 smoothly, the retaining wall portion 9 and the side baffle portion 3 form opposite openings 10 at the lower end of the inner bottom wall. The retaining wall portion 9 and the side baffle portion 3 are connected at side walls of the openings 10 by a connecting baffle 11. The connecting baffle 11 extends upward to connect the aeration top plate portion 2. The cleaning liquid in the retaining wall portion 9 can be discharged smoothly through the opening 10.

The fruit and vegetable cleaning machine of the utility model has an inclined bottom, and is provided with the aeration plate. The side baffle portion at the lower end of the aeration plate is provided with the notch, such that the cleaning liquid in the aeration plate can be quickly and fully discharged. The aeration plate adopts a structure with the side baffle portion, and after assembly with the inner bottom wall of the cleaning tank, two zones for gas dissolution can be formed, such that the gas can be fully dissolved. In particular, the dispersed and uniform arrangement of the aeration holes on the aeration plate enables the gas to form the uniformly dispersed bubbles of a suitable size after passing through the aeration holes.

The embodiments of the utility model have been described in detail above with reference to the accompanying drawings, however, it should be noted that the above-mentioned embodiments are used to illustrate rather than limit the utility model, and those skilled in the art will be able to design many alternative embodiments without departing from the scope of the appended claims. In the claims, the word "comprising" does not exclude the presence of elements or steps other than those listed in the claims. The word "a" or "an" preceding an element does not exclude the presence of a plurality of such elements. The mere fact that certain features are recited in mutually different dependent claims does not indicate that a combination of these features cannot be used to advantage.

What is claimed is:

1. An aeration plate, comprising an aeration top plate portion and a side baffle portion, wherein the aeration top plate portion is scattered with a plurality of aeration holes, and the aeration top plate portion and the side baffle portion cooperate to form an aeration member, wherein the side baffle portion comprises a plurality of holes for liquid passage, and wherein the plurality of holes has a similar shape and are evenly spaced-apart.

2. The aeration plate according to claim 1, wherein the side baffle portion is provided with holes for liquid passage.

3. The aeration plate according to claim 1, wherein the plurality of aeration holes are regularly arranged in rows in the aeration top plate portion.

4. The aeration plate according to claim 3, wherein the plurality of aeration holes are regularly arranged in rows in a length direction of the aeration top plate portion, and are also regularly arranged in rows in a width direction of the aeration top plate portion.

5. A fruit and vegetable cleaning machine, comprising a machine body, wherein the machine body is provided with a cleaning tank with a top opening, and the aeration plate according to claim 1 is provided at an inner bottom wall of the cleaning tank, wherein an area enclosed by the aeration top plate portion, the side baffle portion, and the inner bottom wall forms a first dissolving zone for gas and water, and a second dissolving zone for bubbles and water is formed between a periphery of the aeration plate and the cleaning tank.

6. The fruit and vegetable cleaning machine according to claim 5, wherein the inner bottom wall is inclined, and the side baffle portion located at a lower end of the inner bottom wall is provided with a notch with an open end located at a bottom end surface of the side baffle portion.

7. The fruit and vegetable cleaning machine according to claim 5, wherein the aeration plate is further provided with a mounting hole structure, and the mounting hole structure is a first through hole configured for assembly of a gas inlet valve.

8. The fruit and vegetable cleaning machine according to claim 5, wherein the aeration plate is further provided with a mounting hole structure, the mounting hole structure comprises a first through hole and a second through hole, the first through hole is configured for assembly of a gas inlet valve, the second through hole is configured for configuration of an ultrasonic vibrator, the second through hole is provided with a retaining wall portion downwardly protruding at a peripheral edge, and the first dissolving zone for the gas and the water is formed by the area enclosed by the aeration top plate portion, the side baffle portion, the retaining wall portion, and the inner bottom wall.

9. The fruit and vegetable cleaning machine according to claim 8, wherein the retaining wall portion and the side baffle portion form opposite openings at a lower end of the inner bottom wall; the retaining wall portion and the side baffle portion are connected at side walls of the opposite openings by a connecting baffle; and the connecting baffle extends upward to connect the aeration top plate portion.

10. The aeration plate according to claim 2, wherein the plurality of aeration holes are regularly arranged in rows in the aeration top plate portion.

11. The aeration plate according to claim 10, wherein the plurality of aeration holes are regularly arranged in rows in a length direction of the aeration top plate portion, and are also regularly arranged in rows in a width direction of the aeration top plate portion.

12. The fruit and vegetable cleaning machine according to claim 5, wherein in the aeration plate, the plurality of aeration holes are regularly arranged in rows in the aeration top plate portion.

13. The fruit and vegetable cleaning machine according to claim 12, wherein in the aeration plate, the plurality of aeration holes are regularly arranged in rows in a length direction of the aeration top plate portion, and are also regularly arranged in rows in a width direction of the aeration top plate portion.

14. The fruit and vegetable cleaning machine according to claim 6, wherein the aeration plate is further provided with a mounting hole structure, and the mounting hole structure is a first through hole configured for assembly of a gas inlet valve.

15. The fruit and vegetable cleaning machine according to claim 6, wherein the aeration plate is further provided with a mounting hole structure, the mounting hole structure comprises a first through hole and a second through hole, the first through hole is configured for assembly of a gas inlet valve, the second through hole is configured for configuration of an ultrasonic vibrator, the second through hole is provided with a retaining wall portion downwardly protruding at a peripheral edge, and the first dissolving zone for the gas and the water is formed by the area enclosed by the aeration top plate portion, the side baffle portion, the retaining wall portion, and the inner bottom wall.

16. The fruit and vegetable cleaning machine according to claim 15, wherein the retaining wall portion and the side baffle portion form opposite openings at a lower end of the inner bottom wall; the retaining wall portion and the side baffle portion are connected at side walls of the opposite openings by a connecting baffle; and the connecting baffle extends upward to connect the aeration top plate portion.

\* \* \* \* \*